(12) United States Patent
Kong

(10) Patent No.: US 8,083,375 B2
(45) Date of Patent: Dec. 27, 2011

(54) LAMP DEVICE

(75) Inventor: Kyung-il Kong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/040,470

(22) Filed: Mar. 4, 2011

(65) Prior Publication Data

US 2011/0205737 A1 Aug. 25, 2011

(30) Foreign Application Priority Data

Aug. 18, 2010 (KR) .................. 10-2010-0079812

(51) Int. Cl.
*F21V 33/00* (2006.01)

(52) U.S. Cl. ............... 362/249.02; 362/555; 362/373; 362/294

(58) Field of Classification Search ........... 362/237, 362/240, 249.02, 311.02, 800, 555, 612, 362/294, 373
See application file for complete search history.

(56) References Cited

U.S. PATENT DOCUMENTS

| | | | |
|---|---|---|---|
| 6,053,621 A | 4/2000 | Yoneda | |
| 6,443,582 B1 * | 9/2002 | Tarne et al. ...................... | 362/27 |
| 6,533,429 B2 * | 3/2003 | Yoneda .......................... | 362/600 |
| 7,234,823 B2 * | 6/2007 | Imade ........................... | 353/102 |
| 7,234,837 B2 * | 6/2007 | Hanano .......................... | 362/246 |
| 7,237,927 B2 * | 7/2007 | Coushaine et al. ........... | 362/554 |
| 7,452,087 B2 | 11/2008 | Imade | |
| 2005/0281048 A1 | 12/2005 | Coushaine et al. | |
| 2006/0268549 A1 | 11/2006 | Oehlke | |
| 2007/0091281 A1 | 4/2007 | Radominski et al. | |
| 2008/0186734 A1 * | 8/2008 | Huang et al. .................. | 362/612 |
| 2008/0210953 A1 | 9/2008 | Ladstatter et al. | |
| 2010/0118530 A1 | 5/2010 | Nagai | |

FOREIGN PATENT DOCUMENTS

| | | |
|---|---|---|
| DE | 10 2006 048 571 | 4/2008 |
| EP | 1 466 807 | 10/2004 |
| EP | 1 640 753 | 3/2006 |
| WO | WO 2008/133160 | 11/2008 |

OTHER PUBLICATIONS

European Search Report dated Aug. 3, 2011 (Application No. 11153749.4-2423).

* cited by examiner

*Primary Examiner* — Laura Tso

(74) *Attorney, Agent, or Firm* — KED & Associates LLP

(57) ABSTRACT

Disclosed is a lamp device. The lamp device includes:
a structure which includes an opening and an inner surface forming the opening;
a plurality of light emitting devices disposed on the inner surface of the structure;
a plurality of optical prisms being disposed in a direction perpendicular to the inner surface of the structure and having one ends thereof optically connected to the light emitting diodes; and
a support plate disposed on light emitting surfaces of the optical prisms.

19 Claims, 3 Drawing Sheets

LAMP DEVICE

The present application claims priority under 35 U.S.C. §119(e) of Korean Patent Application No. 10-2010-0079812 filed on Aug. 18, 2010, which is hereby incorporated by reference in its entirety.

BACKGROUND

1. Field

This embodiment relates to a lamp device.

2. Description of the Related Art

A light emitting diode (LED) is an energy device converting electric energy into light energy and has low power consumption, a semi-permanent life span, a rapid response speed, safeness and environment-friendliness as compared with existing light sources like a fluorescent light, an incandescent lamp and the like.

Therefore, many researches are devoted to substitution of the existing light sources with the LED. The LED is now increasingly used as a light source for lighting devices, for example, a liquid crystal display device, an electric sign, a street lamp, a pilot lamp, a room lamp and the like.

SUMMARY

One embodiment is a lamp device. The lamp device includes:
a structure which includes an opening and an inner surface forming the opening;
a plurality of light emitting devices disposed on the inner surface of the structure;
a plurality of optical prisms being disposed in a direction perpendicular to the inner surface of the structure and having one ends thereof optically connected to the light emitting diodes; and
a support plate disposed on light emitting surfaces of the optical prisms.
Another embodiment is a lamp device. The lamp device includes:
a structure which includes an opening and an inner surface forming the opening;
a plurality of light emitting devices disposed on the inner surface of the structure in order to generate light toward the center of the opening of the structure; and
a light guider having a optical prisms which are disposed in a direction perpendicular to the inner surface of the structure and have one ends thereof optically connected to the light emitting diodes,
wherein light converging toward the center of the opening of the structure through the light guider is irradiated toward light emitting surfaces of the structure.

DETAILED DESCRIPTION OF THE EMBODIMENTS

A thickness or size of each layer is magnified, omitted or schematically shown for the purpose of convenience and clearness of description. The size of each component does not necessarily mean its actual size.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

Hereinafter, an embodiment of the present invention will be described in detail with reference to the accompanying drawings.

Figure 1:
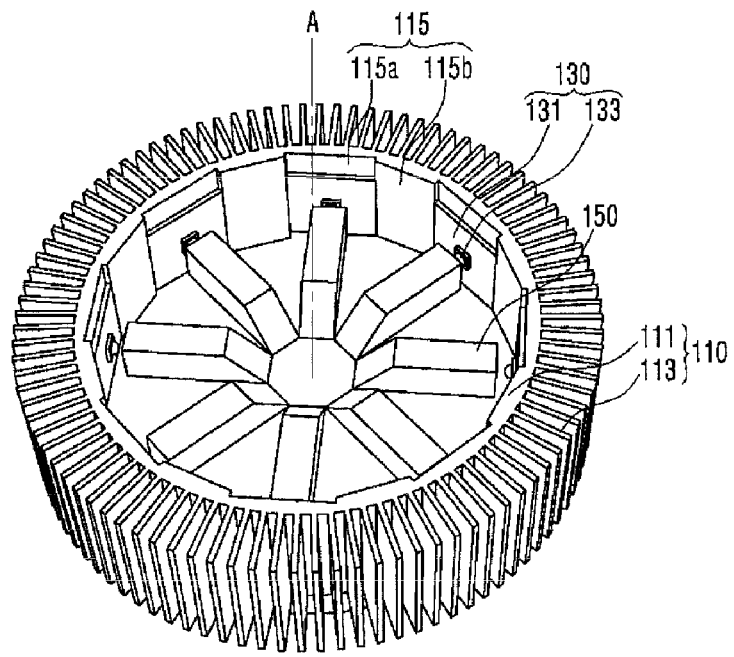
FIG. 1 is a perspective view of a lamp device according to an embodiment of the present invention.
Figure 2:
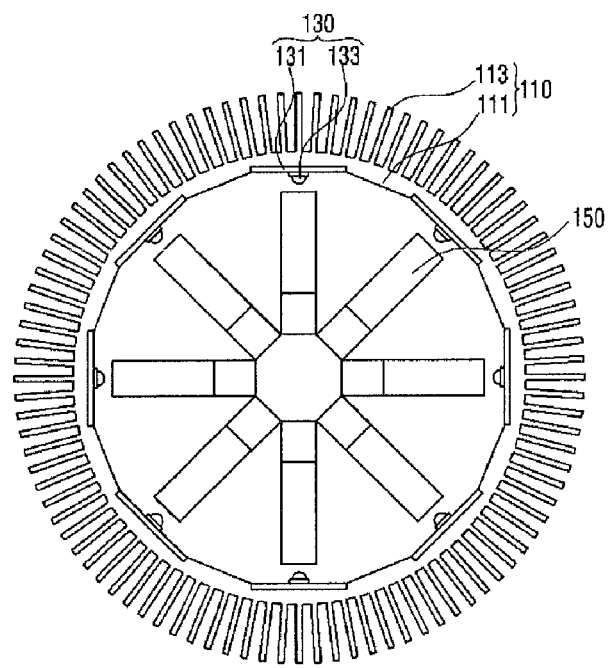
FIG. 2 is a plan view of the lamp device shown in FIG. 1 according to an embodiment of the present invention.
Figure 3:
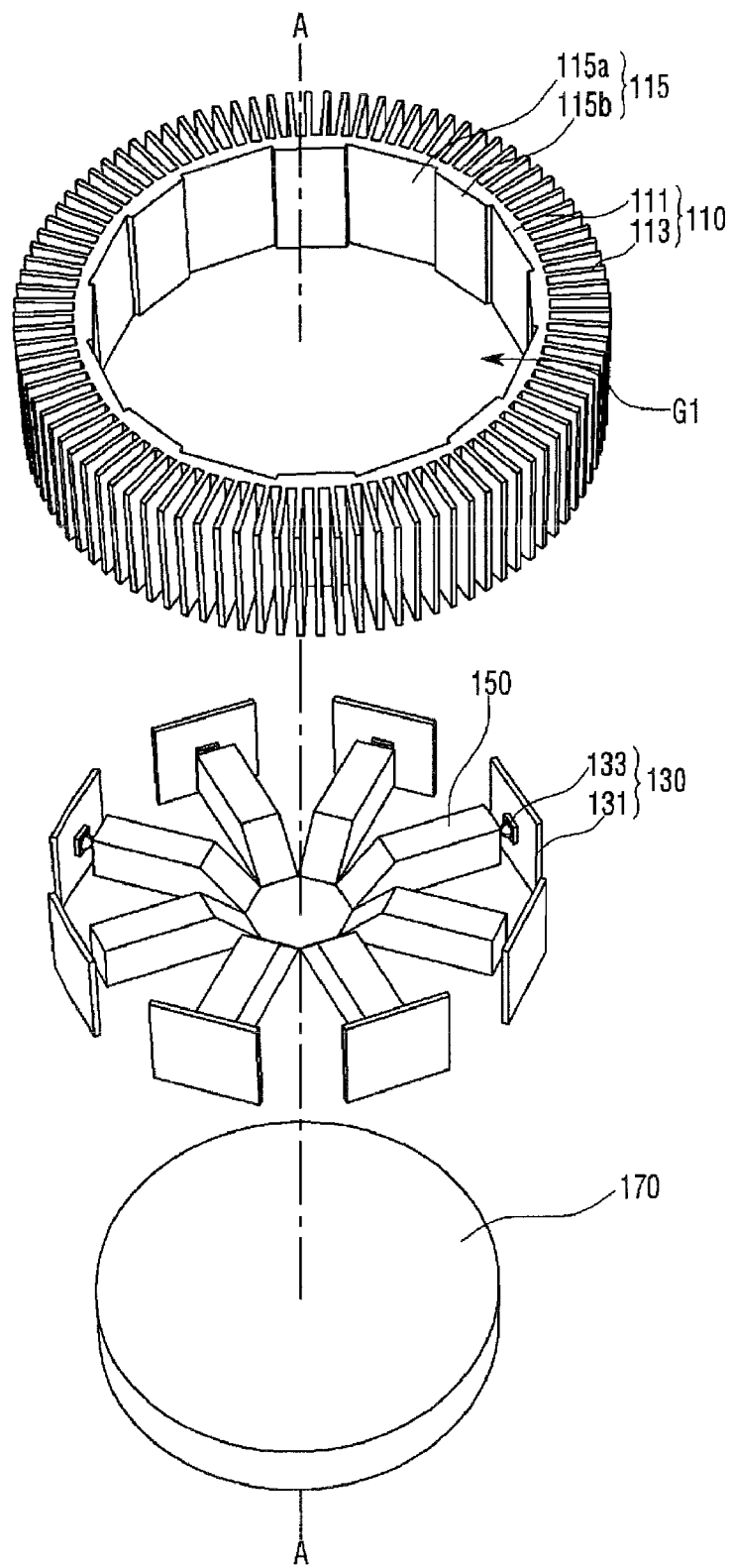
FIG. 3 is an exploded perspective view of the lamp device shown in FIG. 1 according to an embodiment of the present invention.

FIG. 1 is a perspective view of a lamp device according to an embodiment of the present invention. FIG. 2 is a plan view of the lamp device shown in FIG. 1 according to an embodiment of the present invention. FIG. 3 is an exploded perspective view of the lamp device shown in FIG. 1 according to an embodiment of the present invention.

Referring to FIGS. 1 to 3, a lamp device 100 according to an embodiment of the present invention includes a heat radiating body 110, a light source unit 130, a light guider 150 and a support plate 170.

The heat radiating body 110 is formed by organically coupling a ring structure 111 and a plurality of fins 113, so that the heat radiating body 110 has an entire shape of a donut. However, the shape of the heat radiating body 110 is not limited to this. For example, the structure 111 may have a polygonal shape or other various shapes.

The ring structure 111 has an inner surface and an outer surface such that an opening G1 having a central axis is formed in the center of the ring structure 111. A plurality of the fins 113 are joined to the outer surface of the ring structure 111 and radially extend to the outside from the outer surface of the ring structure 111. A plurality of the fins 113 may be separated from each other at a regular interval such that heat generated from the light source unit 130 which will be described below is wholly uniformly radiated to the outside.

The inner surface of the ring structure 111 includes a plurality of flat portions 115. The flat portion 115 includes a plurality of insertion portions 115a and a plurality of projections 115b. The light source unit 130 is seated on each of a plurality of the insertion portions 115a. A plurality of the projections 115b function as a guide fixing and supporting the light source unit 130 seated on the insertion portions 115a. A plurality of the flat portions 115 include at least two flat portions which are parallel with each other and facing each other, so that a plurality of the light source units 130 are symmetrically placed on the inner surface of the ring structure. That is, a plurality of the light source units 130 are radially disposed on the inner surface of the ring structure at an equal interval on the basis of the opening G1. While a plurality of the light source units 130 include light emitting diodes (LEDs) in the embodiment of the present invention, any light emitting device capable of emitting light can be used as the light source unit without being limited to this.

As such, the light source unit is disposed along the inner surface of the circular heat radiating body. Therefore, when the lamp device is operated, heat generated from the light source unit is radially radiated, so that heat release efficiency is improved.

Though not shown in the drawings, a conductive sheet for radiating heat is further added between the inner surface of the heat radiating body 110 and the light source unit 130, so that it is possible to enhance the heat transfer characteristic between the heat radiating body 110 and the light source unit 130.

The light source unit 130 includes a substrate 131 and a light emitting diode (LED) 133 disposed on the substrate.

The light guider 150 consists of a plurality of optical prisms. One ends of the optical prisms are optically connected to a plurality of the light emitting diodes, i.e., the light source unit 130. The light guider 150 is hereby radially disposed on the support plate 170 on the basis of a central axis "A" of the support plate 170. Specifically, a plurality of the optical prisms extend from a plurality of the LEDs 133 toward the central axis "A" of the opening G1 of the ring structure 111 respectively. Such optical prism has a square pillar shape, and its end surface extending toward the central axis of the opening of the ring structure 111 is inclined at an obtuse angle with respect to the top surface among four sides of the square pillar.

While the optical prism has a square pillar shape in this embodiment, the optical prism may have various shapes without being limited to this. The end surface of the optical prism is not limited to be inclined at a particular angle. In other words, the end surface of the optical prism is freely inclined with respect to the top surface of the square pillar such that light distribution characteristic of the optical prism can be controlled.

In a plurality of the optical prisms disposed on the support plate 170, though the ends of the adjacent optical prisms may be disposed and spaced apart from each other at a regular interval, the ends of the adjacent optical prisms are in contact with each other for the purpose of improving a light converging characteristic. Accordingly, the ends of a plurality of the optical prisms are in contact with each other, so that a closed curve is substantially formed.

The aforementioned arrangement structure of the light guider 150 allows light to be efficiently converged only by using the light guider instead of various optical means required for converging light, so that the structure is substantially simplified and manufacturing cost thereof can be reduced. The optical prism has been taken as an example of the light guider 150 in the embodiment of the present invention, any device capable of changing the direction of light generated from the light source unit 130 into a desired direction can be used as the light guider 150.

Figure 4:
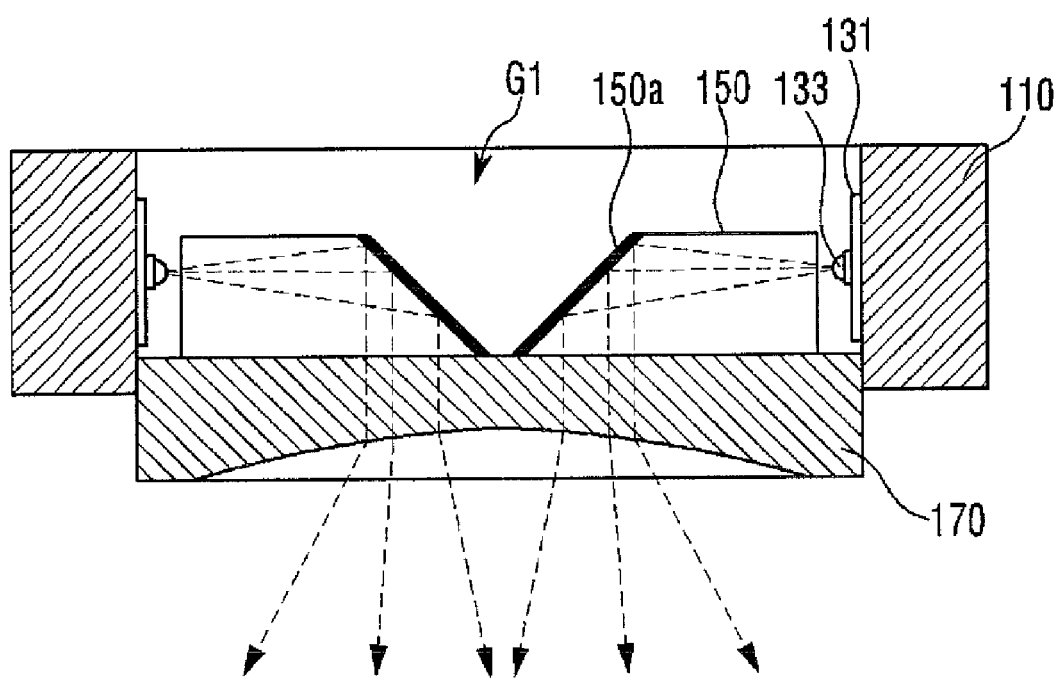
FIG. 4 is a view for describing an optical path characteristic of a lamp device in an embodiment of the present invention.

The support plate 170 has a flat surface allowing the light guider 150 to be placed on the same plane. As shown in FIG. 4, the support plate 170 is inserted and fixed to the lower part of the opening of the heat radiating body 110. The support plate 170 is disposed under the light guider and supports the light guider. The support plate 170 is made of an optical transmitting material such that light converged by the light guider is emitted to the outside through the support plate.

FIG. 4 is a view for describing an optical path characteristic of a lamp device in an embodiment of the present invention.

As shown, light emitted from the LEDs 133 travels toward the center of the opening G1 of the ring structure along the inside of the optical prism 150 disposed perpendicular to the inner surface of the ring structure 111. Then, the light is reflected by a reflective material 150a coated on the end surface of the optical prism and is emitted toward the support plate 170.

The light reflected by the end surface of the optical prism is incident substantially perpendicular to the top surface of the support plate 170 contacting with the bottom surface of the optical prism. The incident light is emitted to the outside through the support plate made of an optical transmitting material. Here, the lower part of the support plate is formed concave toward a side on which light is incident. This intends to obtain a light distribution characteristic when light converged by using the optical prism is emitted to the outside.

Since the lamp device mentioned above includes a heat radiating body having a structure in which the heat generated from the light emitting diodes can be radiated spatially not in an up-and-down direction but in a horizontal direction when the lamp device is operated, the entire volume of the lamp device can be substantially reduced. Accordingly, as compared with a conventional heat radiating body radiating heat in the up-and-down direction, the heat radiating body of the present invention has a lower spatial limitation when the lamp device is installed. As a result, installation flexibility can be improved.

The features, structures and effects and the like described in the embodiments are included in at least one embodiment of the present invention and are not necessarily limited to one embodiment. Furthermore, the features, structures and effects and the like provided in each embodiment can be combined or modified in other embodiments by those skilled in the art to which the embodiments belong. Therefore, the contents related to the combination and modification should be construed to be included in the scope of the present invention.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A lamp device, comprising:
a structure having an opening and an inner surface that forms the opening;
a plurality of light emitting devices disposed on the inner surface of the structure;
a plurality of optical prisms, each being disposed so as to extend in a direction perpendicular to the inner surface of the structure and having one end thereof optically connected to the plurality of light emitting devices; and
a support plate disposed on light emitting surfaces of the plurality of optical prisms, wherein a lower part of the support plate is formed concave toward a side on which light is incident.

2. The lamp device of claim 1, wherein the structure has a ring shape.

3. The lamp device of claim 1, wherein the inner surface of the structure comprises a plurality of flat portions, and wherein the plurality of light emitting devices is disposed on the plurality of flat portions.

4. The lamp device of claim 3, wherein at least two flat portions of the plurality of flat portions are substantially parallel with each other and face each other.

5. The lamp device of claim 1, wherein the structure comprises a plurality of fins that radiates heat generated from the plurality of light emitting devices, and wherein the plurality of fins is connected to an outer surface of the structure and extends radially.

6. The lamp device of claim 1, wherein the plurality of optical prisms each extends in the form of a square pillar from the plurality of light emitting devices toward a central axis of the opening of the structure, wherein an end surface of the square pillar is inclined at an obtuse angle with respect to a top surface of the square pillar, and wherein the end surface of the square pillar is coated with a reflective material.

7. The lamp device of claim 6, wherein ends of adjacent optical prisms of the plurality of optical prisms are in contact with each other, so that a closed curve is substantially formed by the ends of the optical prisms.

8. The lamp device of claim 1, wherein the plurality of optical prisms is radially disposed with respect to the support plate.

9. The lamp device of claim 1, wherein light emitted from the plurality of light emitting devices is reflected substantially in a direction perpendicular to a bottom surface of the plurality of optical prisms from end surfaces of the plurality of optical prisms.

10. The lamp device of claim 1, wherein the support plate is made of an optical transmitting material.

11. The lamp device of claim 1, wherein the light emitting surfaces of the plurality of optical prisms are on the same plane.

12. A lamp device, comprising:
- a structure having an opening and an inner surface that forms the opening;
- a plurality of light emitting devices disposed on the inner surface of the structure;
- a plurality of optical prisms, each being disposed so as to extend in a direction perpendicular to the inner surface of the structure and having one end thereof optically connected to the plurality of light emitting devices; and
- a support plate disposed on light emitting surfaces of the plurality of optical prisms, wherein the support plate is inserted into a lower part of the opening of the structure and supports the plurality of optical prisms.

13. The lamp device of claim 1, wherein the plurality of light emitting devices is radially disposed on the inner surface of the structure and spaced at equal intervals.

14. The lamp device of claim 1, wherein a conductive sheet is disposed between the plurality of light emitting devices and the inner surface of the structure.

15. A lamp device, comprising:
- a structure having an opening and an inner surface that forms the opening;
- a plurality of light emitting devices disposed on the inner surface of the structure in order to generate light toward a center of the opening of the structure; and
- a light guider having a plurality of optical prisms each disposed so as to extend in a direction perpendicular to the inner surface of the structure and have one end thereof optically connected to the plurality of light emitting devices, wherein light converging toward the center of the opening of the structure through the light guider is irradiated toward light emitting surfaces of the structure, and wherein light emitting surfaces of the plurality of optical prisms are on the same plane.

16. The lamp device of claim 15, wherein light emitted from the plurality of light emitting devices is reflected substantially in a direction perpendicular to a bottom surface of the light guider from an end surface of the light guider.

17. The lamp device of claim 15, wherein the inner surface of the structure comprises a plurality of flat portions, and wherein the plurality of light emitting devices is disposed on the plurality of flat portions.

18. The lamp device of claim 17, wherein at least two flat portions of the plurality of flat portions are substantially parallel with each other and face each other.

19. The lamp device of claim 15, wherein the structure comprises a plurality of fins that radiates heat generated from the plurality of light emitting devices, and wherein the plurality of fins is connected to an outer surface of the structure and extends radially.

* * * * *